(12) United States Patent
Wu et al.

(10) Patent No.: US 7,813,415 B2
(45) Date of Patent: Oct. 12, 2010

(54) SYSTEM FOR AUTOMATIC BANDWIDTH CONTROL OF EQUALIZER ADAPTATION LOOPS

(75) Inventors: Ephrem C. Wu, San Mateo, CA (US);
Ye Liu, San Jose, CA (US); Freeman V. Zhong, San Ramon, CA (US)

(73) Assignee: LSI Corporation, Milpitas, CA (US)

( * ) Notice: Subject to any disclaimer, the term of this patent is extended or adjusted under 35 U.S.C. 154(b) by 649 days.

(21) Appl. No.: 11/760,844

(22) Filed: Jun. 11, 2007

(65) Prior Publication Data

US 2008/0304559 A1  Dec. 11, 2008

(51) Int. Cl.
*H04B 1/38* (2006.01)
(52) U.S. Cl. .................. 375/219; 375/229; 375/230; 375/231; 375/232; 375/233; 375/234
(58) Field of Classification Search ............. 375/219, 375/229, 230, 231, 232, 233, 234
See application file for complete search history.

(56) References Cited

U.S. PATENT DOCUMENTS

| | | | | |
|---|---|---|---|---|
| 5,541,956 | A * | 7/1996 | Ueda | 375/232 |
| 6,185,250 | B1 * | 2/2001 | Wang et al. | 375/222 |
| 6,275,510 | B1 * | 8/2001 | Koenig et al. | 370/535 |
| 6,570,917 | B1 * | 5/2003 | Lai et al. | 375/232 |
| 6,578,092 | B1 * | 6/2003 | Lau et al. | 710/29 |
| 7,483,481 | B1 * | 1/2009 | Ghobrial et al. | 375/233 |
| 2003/0227842 | A1 * | 12/2003 | Shim et al. | 369/47.26 |
| 2004/0199559 | A1 * | 10/2004 | McAdam et al. | 708/322 |
| 2005/0008105 | A1 * | 1/2005 | Agazzi et al. | 375/341 |
| 2006/0018329 | A1 * | 1/2006 | Nielsen et al. | 370/401 |
| 2007/0035866 | A1 * | 2/2007 | Wu et al. | 360/29 |
| 2007/0110199 | A1 * | 5/2007 | Momtaz et al. | 375/350 |
| 2007/0280388 | A1 * | 12/2007 | Torre et al. | 375/350 |

FOREIGN PATENT DOCUMENTS

JP        2000049666 A    *   2/2000

OTHER PUBLICATIONS

Azadet, "DSP implementation issues in 1000BASE-T Gigabit Ethernet," 2001 International Symposium on VLSI Technology, Systems, and Applications, 2001, Proceedings of Technical Papers, Apr. 18-20, 2001 pp. 109-112.*

Azadet, "Low-power equalizer architectures for high speed modems," Communications Magazine, IEEE vol. 36, Issue 10, Oct. 1998 pp. 118-126.*

* cited by examiner

*Primary Examiner*—Juan A Torres
(74) *Attorney, Agent, or Firm*—Christopher P. Maiorana, PC

(57) ABSTRACT

A method to reduce peak power consumption during adaptation for an integrated circuit (IC) with multiple serial link transceivers including the steps of (A) inactivating equalizer adaptation loops until a triggering event occurs, (B) when the triggering event occurs, determining whether the triggering event is a minor change or a major change, (C) when the triggering event is a minor change, spreading out activation of adaptation loops in time, and (D) when the triggering event is a major change, simultaneously activating all adaptation loops.

20 Claims, 5 Drawing Sheets

SYSTEM FOR AUTOMATIC BANDWIDTH CONTROL OF EQUALIZER ADAPTATION LOOPS

RELATED APPLICATIONS

This application may be related to a commonly owned patent application U.S. Ser. No. 11/418,702, filed May 5, 2006, which is herein incorporated by reference in its entirety.

FIELD OF THE INVENTION

The present invention relates to communication networks generally and, more particularly, to a system for automatic bandwidth control of equalizer adaptation loops.

BACKGROUND OF THE INVENTION

For a high speed serial link transceiver, signal integrity and power are two major concerns. Signal integrity can be affected by channel characteristics (i.e., skin loss, dielectric loss and return loss). Channel characteristics can change over time due to operating environment changes. Operating environment changes can include changes in temperature, humidity, and power supply voltage. Adapting equalizer parameters during initialization and freezing equalizer parameters thereafter ignores operating environment changes. Ignoring operating environment changes can result in performance degradation. Power consumption is a concern because over two hundred serial link transceivers can be integrated on one chip today.

Users of serial link transceivers typically focus on getting error-free data transmission and do not consider power consumption. To achieve a low bit-error ratio (BER) in long-reach channels at high transmission speed, equalization methods such as linear equalization (LE) and decision feedback equalization (DFE) are used to overcome channel loss. Optimal, or close to optimal, performance depends on properly setting equalizer parameters, such as tap coefficients, gain factor and filter pole/zero positions. Conventional adaptation bandwidth control is manual. Manual adaptation bandwidth control makes the serial link transceivers difficult to use in the field. Adapting equalizer parameters too frequently (high bandwidth) adds jitter due to parameter quantization noise. Adapting equalizer parameters too infrequently (low bandwidth) can smooth out excessive changes in the parameters, but may miss operational environment changes.

It would be desirable to have an automatic adaptation bandwidth control and scheduling of equalizer parameter updates.

SUMMARY OF THE INVENTION

The present invention concerns a method to reduce peak power consumption during adaptation for an integrated circuit (IC) with multiple serial link transceivers including the steps of (A) inactivating equalizer adaptation loops until a triggering event occurs, (B) when the triggering event occurs, determining whether the triggering event involves a minor change or a major change, (C) when the triggering event involves a minor change, spreading out activation of adaptation loops in time, and (D) when the triggering event involves a major change, simultaneously activating all adaptation loops.

The objects, features and advantages of the present invention include providing a method and/or apparatus for automatic bandwidth control of equalizer adaptation loops that may (i) provide automatic bandwidth control of decision feedback equalization (DFE), linear equalization (LE) and gain adaptation, (ii) achieve better bit error rate (BER) performance than conventional solutions, (iii) automatically activate and deactivate transceiver adaptation loops in two phases, (iv) include a training phase and an operating phase, (v) reduce peak power consumption during adaptation, (vi) be implemented in integrated circuits with multiple serial link transceivers, (vii) distinguish between minor and major changes in operating environment, (viii) spread out adaptation loops in time for minor changes in operating environment, (ix) perform adaptation tap by tap, (x) perform adaptation channel by channel, (xi) simultaneously adapt all taps and channels for major changes in operating environment, (xii) minimize performance degradation and/or (xiii) be used in high-speed transceivers, serializer/deserializers (SerDes), data transmission systems and data storage systems.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally provides adaptation bandwidth control (e.g., careful timing of when adaptation occurs) to facilitate error-free signal transmission. The present invention generally provides automatic adaptation bandwidth control that ensures error-free data transmission while keeping power consumption low and not limiting users to signal integrity experts.

Figure 1:
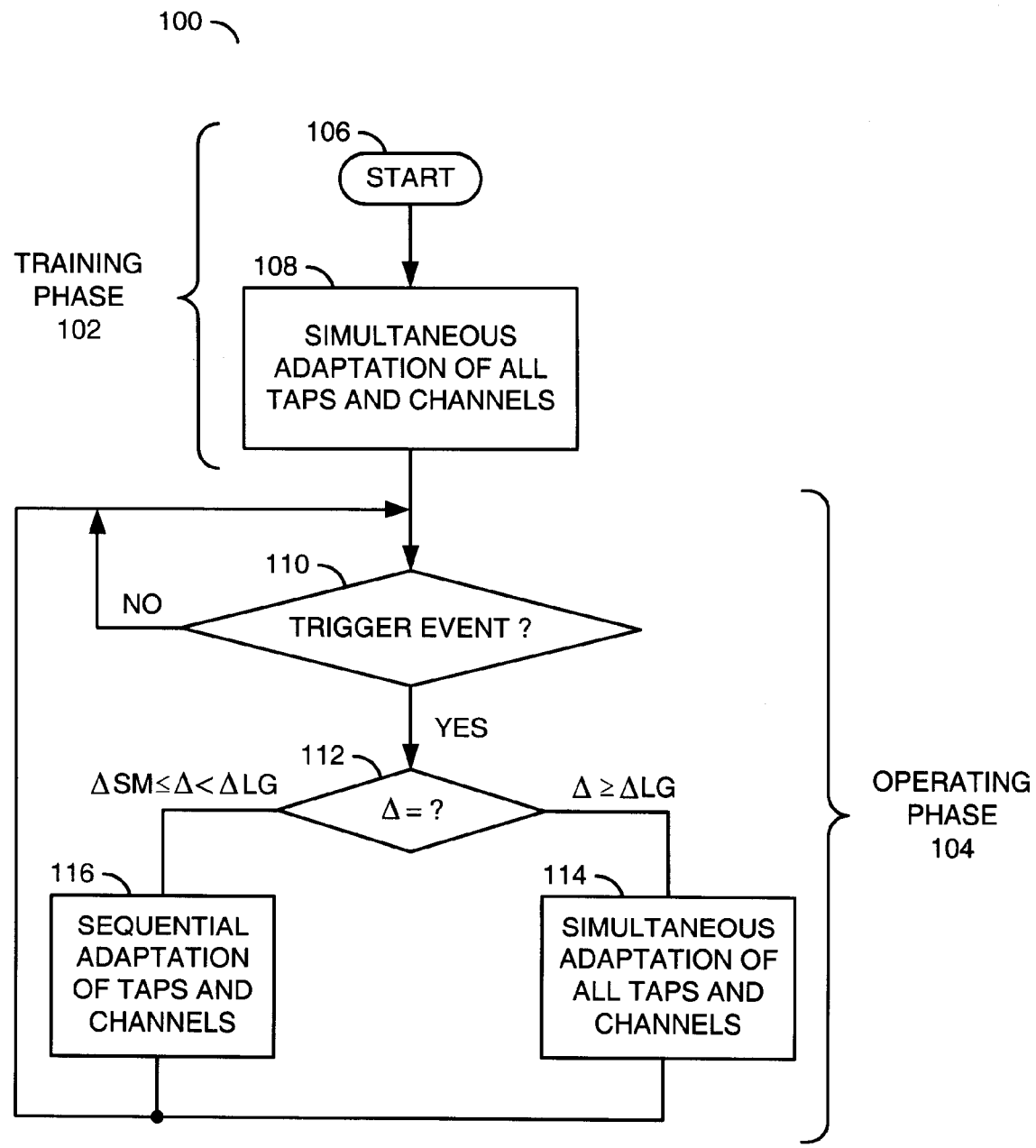
FIG. 1 is a flow diagram illustrating a automatic bandwidth control process in accordance with a preferred embodiment of the present invention.

Referring to FIG. 1, a flow diagram is shown illustrating an automatic adaptation bandwidth control process 100 in accordance with a preferred embodiment of the present invention. The process 100 may be divided into two phases: a first (or training) phase 102 and a second (or operating) phase 104. The first phase may comprise a block (or state) 106 and a block (or state) 108. The state 106 may be implemented as a start state. The state 108 may be implemented as a simultaneous adaptation state (or process). In one example, the process 100 may begin the training phase 102 by entering the state 106. The training phase 102 may continue by moving to the state 108. In the state 108, the process 100 may simultaneously perform (or activate) adaptation of all taps and all channels. When adaptation of all taps and all channels is complete, the process 100 may move to the operating phase 104.

The operating phase 104 may comprise a block (or state) 110, a block (or state) 112, a block (or state) 114 and a block (or state) 116. The state 110 may be implemented as a first decision state. In one example, the state 110 may be configured to determine whether one or more predetermined events for triggering adaptation have occurred. The state 112 may be implemented as a second decision state. In one example, the state 112 may be configured to determine an amount (or magnitude) of change in one or more parameters associated with the one or more predetermined triggering events. The state 114 may be implemented as a simultaneous adaptation state. In one example, the state 114 may be implemented similarly to the state 108. The state 116 may be implemented as a sequential adaptation state. In one example, the state 116 may be configured to perform adaptation of taps and channels on a tap by tap and channel by channel basis.

The process 100 may begin the operating phase 104 by entering the state 110. In the state 110, the process 100 may determine whether one or more predetermined triggering events have occurred. In one example, the one or more triggering events may include, but are not limited to, (i) a periodic wake-up, (ii) a temperature change, (iii) a supply voltage change and (iv) a change in a predetermined coefficient. However, other triggering events may be implemented accordingly to meet the design criteria of a particular implementation. When no triggering events have occurred, the process 100 may remain in the state 110 until a triggering event occurs (e.g., the path labeled NO). When a triggering event occurs, the process 100 may move to the state 112 (e.g., the path labeled YES).

In the state 112, the process 100 may determine whether the one or more predetermined triggering events involved a small change or a large change in an associated parameter. In one example, the parameters may include, but are not limited to, humidity, temperature, supply voltage, current, frequency and master coefficients (described in more detail below). However, other parameters may be implemented accordingly to meet the design criteria of a particular implementation. When a major change has occurred, the process 100 may move to the state 114. When a minor change has occurred, the process 100 may move to the state 116. When the process 100 completes the process associated with either the state 114 or the state 116, the process 100 may return to the state 110.

The amount of change in the parameters associated with the triggering events may be determined, in one example, using predefined thresholds. In one example, each parameter may have a respective first (or small) threshold (e.g., $\Delta_{small}$) and a respective second (or large) threshold ($\Delta_{large}$). In one example, a change (e.g., $\Delta$) may be considered minor when an amount (or magnitude) of the change is greater than or equal to the respective first threshold and less than the respective second threshold (e.g., $\Delta_{small} \leq \Delta \leq \Delta_{large}$) The change may be considered major when the amount (or magnitude) of the of change is greater than or equal to the second threshold (e.g., $\Delta_{large} \leq \Delta$). However, other comparisons may be implemented accordingly to meet the design criteria of a particular implementation.

Figure 2:
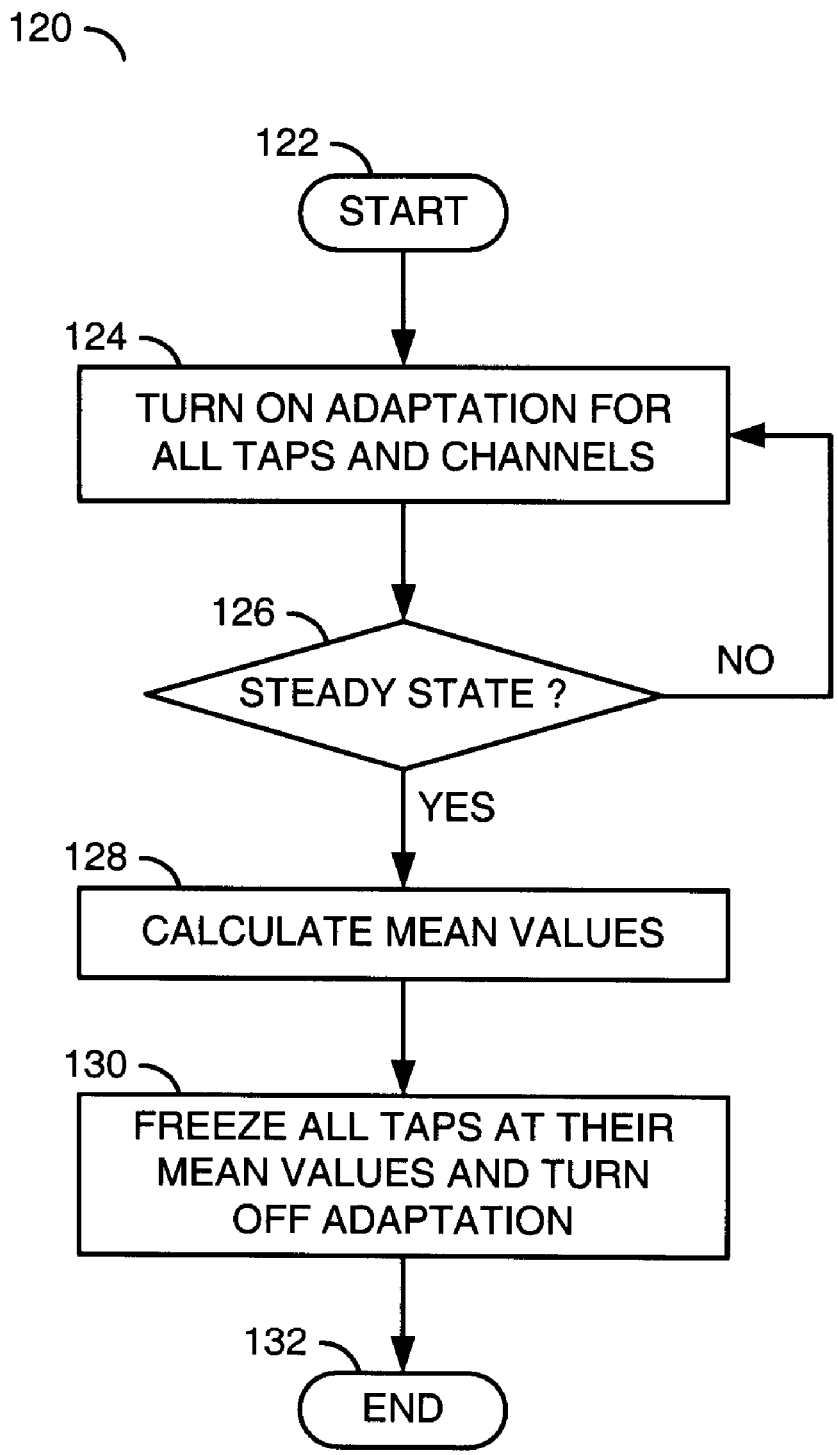
FIG. 2 is a flow diagram illustrating a process for simultaneous adaptation of equalizer parameters.

Referring to FIG. 2, a flow diagram is shown illustrating an example process 120 for simultaneous adaptation of equalization parameters in accordance with the present invention. In one example, the process 120 may be used to implement the states 108 and 114 of the process 100. The process 120 may comprise a block (or state) 122, a block (or state) 124, a block (or state) 126, a block (or state) 128, a block (or state) 130 and a block (or state) 132. The state 122 may comprise a start state. The state 124 may comprise an adaptation activation state (or process). The state 126 may comprise a decision state. The state 128 may comprise a calculating state (or process). The state 130 may comprise an adaptation deactivation state (or process). The state 132 may comprise an end state.

The process 120 may be initiated by entering the state 122. The process 120 may then move to the state 124. In the state 124, adaptation may be activated (or turned on), in one example, for all taps and all channels. When adaptation is activated for all taps and all channels, the process 120 may move to the state 126. In the state 126, the process 120 may determine whether a steady state condition has been achieved. In one example, the process 120 may wait for a steady state condition (e.g., looping through the states 124 and 126 until the adaptation parameters have achieved the steady state condition).

When the adaptation parameters have achieved the steady state condition, the process 120 may move to the state 128. In the state 128, the process 120 may determine mean values for the adaptation parameters (e.g., tap and gain coefficients) based on a set of steady state values for each of the parameters. When the mean values have been determined, the process 120 may move to the state 130. In the state 130, the process 120 may freeze the parameters at the respective mean values and deactivate (or turn off) adaptation. When adaptation is deactivated, the process 120 may move to the state 132 and end.

Figure 3:
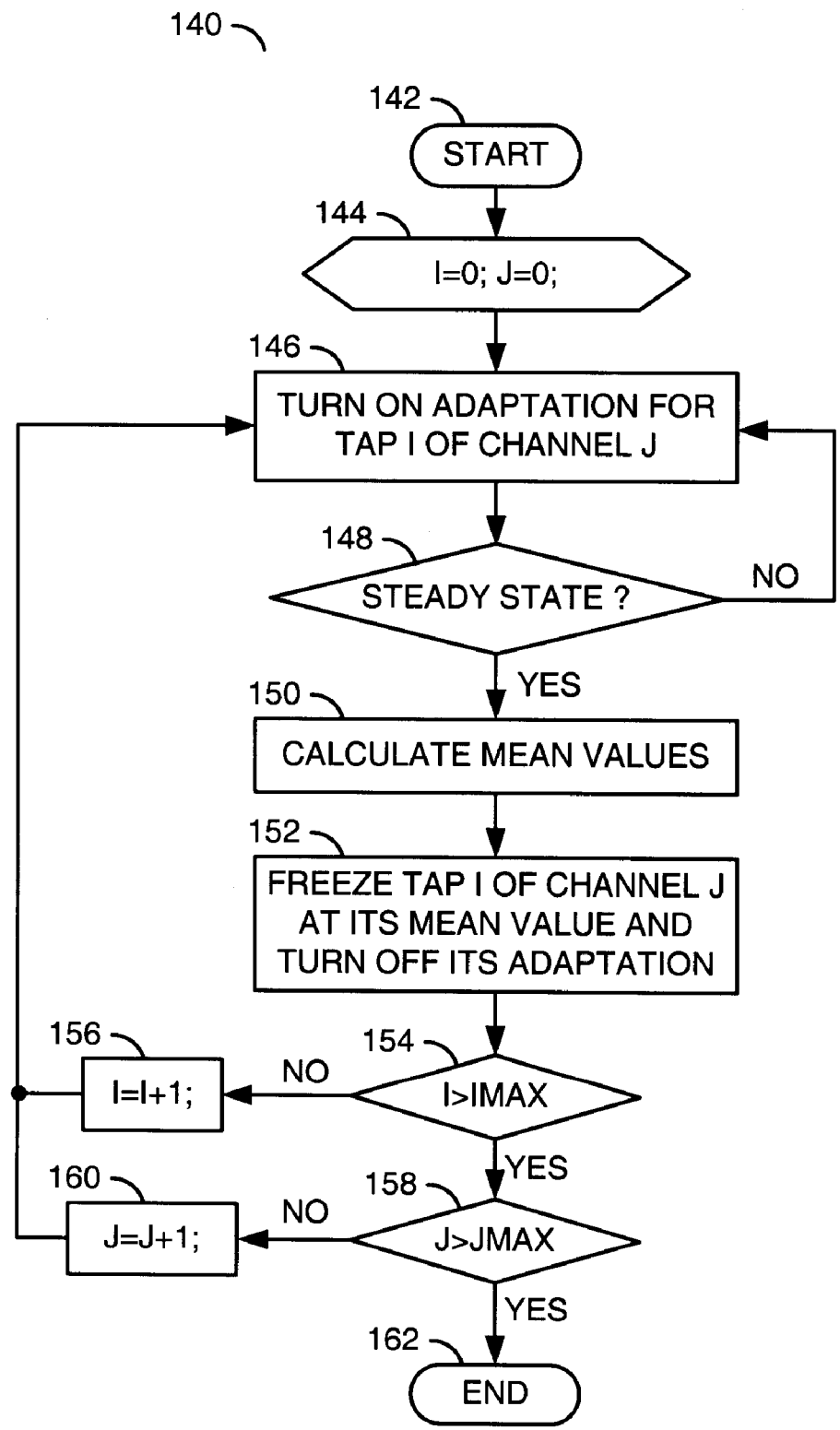
FIG. 3 is a flow diagram illustrating a process for sequential adaptation of equalizer parameters.

Referring to FIG. 3, a flow diagram is shown illustrating an example process 140 for sequential adaptation of equalization parameters in accordance with the present invention. In one example, the process 140 may be used to implement the state 116 of the process 100. The process 140 may comprise a block (or state) 142, a block (or state) 144, a block (or state) 146, a block (or state) 148, a block (or state) 150, a block (or state) 152, a block (or state) 154, a block (or state) 156, a block (or state) 158, a block (or state) 160 and a block (or state) 162. The state 142 may comprise a start state. The state 144 may comprise a variable initialization state (or process). The state 146 may comprise an adaptation activation state (or process). The state 148 may comprise a decision state. The state 150 may comprise a calculating state. The state 152 may comprise an adaptation deactivation state (or process). The state 154 may comprise a decision state. The state 156 may comprise a variable update state (or process). The state 158 may comprise a decision state. The state 160 may comprise a variable update state (or process). The state 162 may comprise an end state.

The process 140 may be initiated by entering the state 142. The process 140 may continue by moving to the state 144. In the state 144, variables representing adaptation parameters (e.g., tap number, channel number, etc.) for adaptation activation (e.g., I and J) may be set to an initial value (e.g., 0). Variables representing, for example, a total number of taps and total number of channels to be adapted (e.g., IMAX and JMAX, respectively) may also be initialized (or set). Variables representing other parameters to be adapted may be implemented accordingly to meet the design criteria of a particular implementation.

When the variables have been initialized, the process 140 may move to the state 146. In the state 146, adaptation may be activated (or turned on), in one example, for a particular tap and a particular channel determined based upon the value of the variables I and J. When adaptation is activated for the particular tap of the particular channel, the process 140 may move to the state 148. In the state 148, the process 140 may determine whether a coefficient for the selected tap of the selected channel has reached a steady state condition. In one example, the process 140 may loop through the states 146 and 148 until the coefficient for the selected tap of the selected channel has achieved the steady state condition. In another example, the process 140 may loop within the state 148 until the coefficient for the selected tap of the selected channel has achieved the steady state condition.

When the coefficient for the selected tap of the selected channel has achieved the steady state condition, the process 140 may move to the state 150. In the state 150, the process 140 may determine mean values for the tap and gain coefficients based on a set of steady state values. When the mean values have been determined, the process 140 may move to the state 152. In the state 152, the process 140 may freeze the selected tap of the selected channel at the respective mean values and deactivate (or turn off) adaptation of the selected tap of the selected channel. When the adaptation of the selected tap of the selected channel has been deactivated, the process 140 may move to the state 154.

In the state 154, the process 140 may determined whether adaptation for all of the taps of the selected channel has been completed. When all of the taps of the selected channel have not had adaptation performed, the process 140 moves to the state 156. When all of the taps of the selected channel have had adaptation performed, the process 140 moves to the state 158. In the state 156, the process 140 selects the next tap of the selected channel and moves to the state 146.

In the state 158, the process 140 may determined whether adaptation for all of the channels has been completed. When all of the channels have not had adaptation performed, the process 140 moves to the state 160. In the state 160, the process 140 selects the next channel and moves to the state 146. When all of the channels have had adaptation performed, the process 140 moves to the state 162 and ends.

Figure 4:
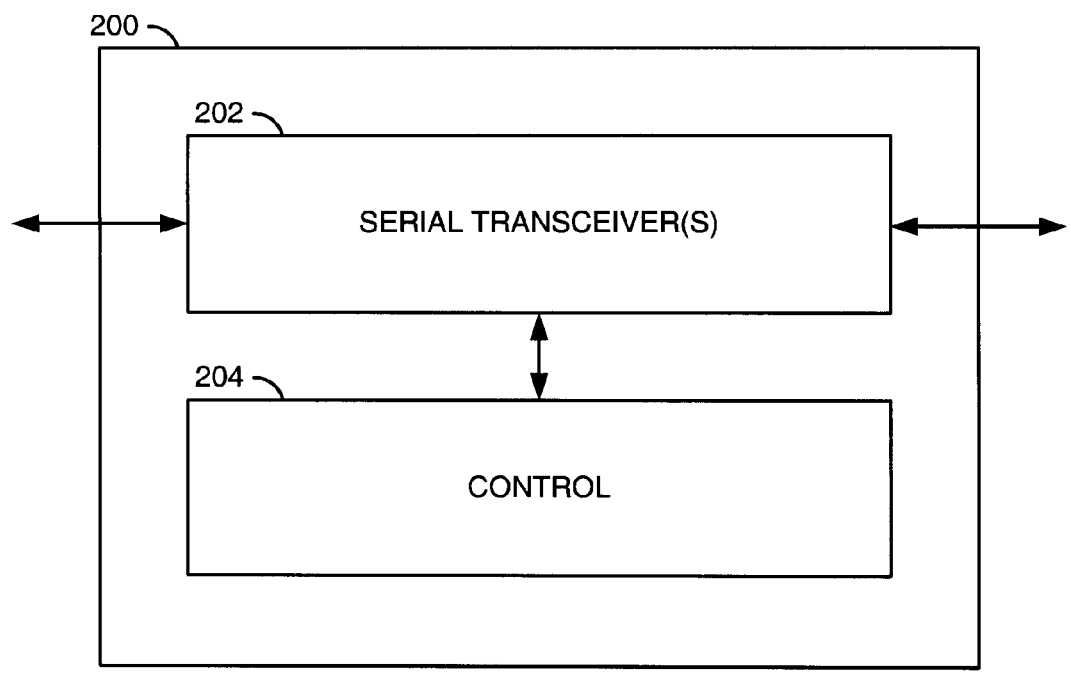
FIG. 4 is a block diagram illustrating a serial transceiver in accordance with the present invention.

Referring to FIG. 4, a block diagram is shown illustrating an integrated circuit (IC) 200 in accordance with the present invention. In one example, the IC 200 may comprise a serial transceiver IC. The serial transceiver IC 200 may comprise a block (or circuit) 202 and a block (or circuit) 204. The block 202 may be implemented, in one example, as a plurality of serial link transceivers. The block 204 may be implemented, in one example, as a control block (or circuit). In one example, the block 204 may be implemented as an automatic adaptation bandwidth control circuit configured to (i) initialize equalizer coefficients of the block 202, (ii) inactivate equalizer adaptation loops of the block 202 until a triggering event occurs, (iii) determine whether the triggering event involves a minor change or a major change (e.g., to an operating environment of the serial transceiver IC 200), (iv) spread out activation of the equalizer adaptation loops of the block 202 in time when a minor change has occurred, and (v) simultaneously activate all of the equalizer adaptation loops of the block 202 when a major change has occurred. In one example, the block 204 may be implemented with software and/or firmware configured to perform an adaptation control process or processes as described above in connection with FIGS. 1-3.

Figure 5:
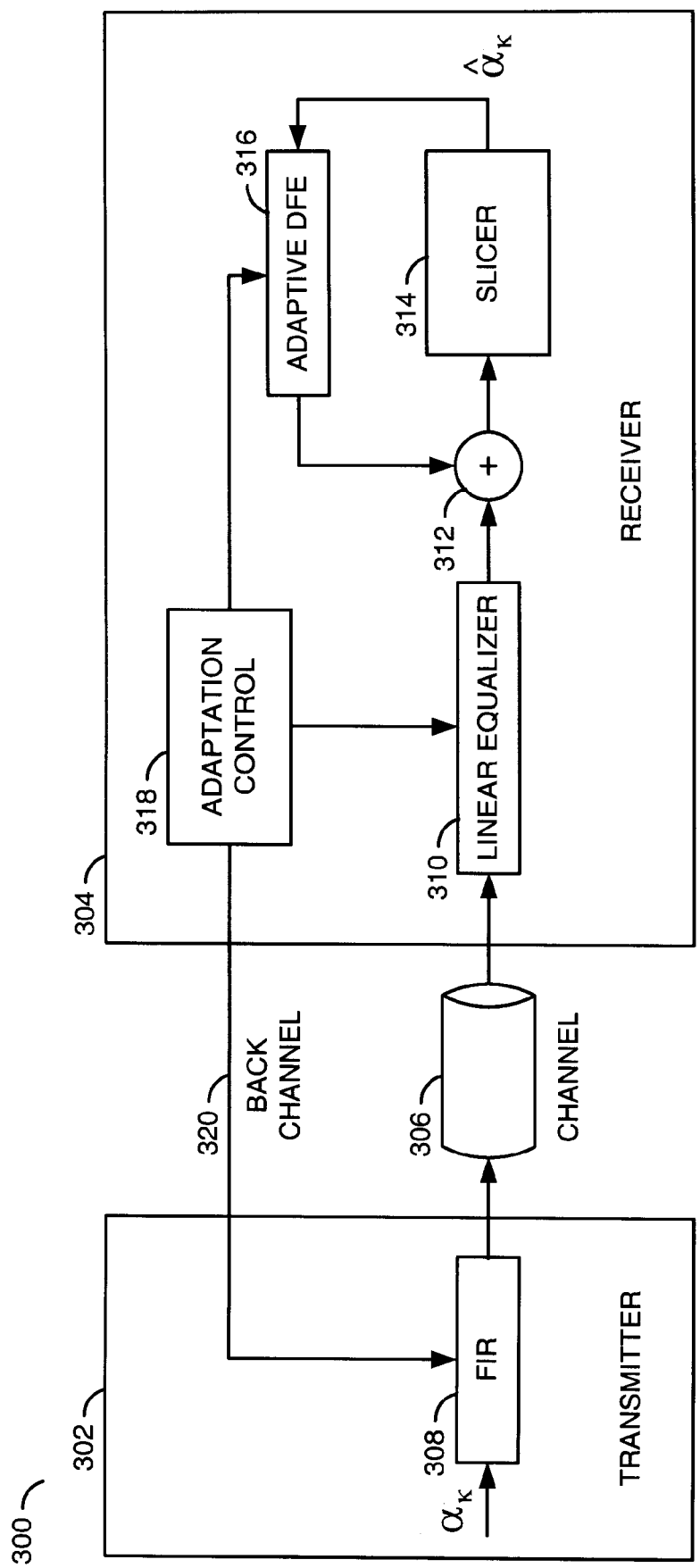
FIG. 5 is a block diagram illustrating a communication channel in accordance with the present invention.

Referring to FIG. 5, a block diagram is shown illustrating a communication channel 300 in accordance with the present invention. The communication channel 300 may comprises a transmitter 302, a receiver 304 and a channel medium 306. The transmitter 302 and the receiver 304 may be implemented on different chips. In one example, the channel medium 306 may be implemented as a circuit board trace or cable. The transmitter may include a filter 308. The filter 308 may comprise a pre-emphasis filter configured (or adapted) to compensate for a transfer characteristic of the channel medium 306. In one example, the filter 308 may be implemented as a finite impulse response (FIR) filter. A signal (e.g., $a_k$) to be communicated may be presented to an input of the filter 308. An output of the filter 308 may present a filtered version of the signal $a_k$ to the channel medium 306.

The receiver 304 may comprise a linear equalizer 310, an adder 312, a slicer 314, an adaptive decision feedback equalizer (DFE) 316 and an adaptation control block 318. The linear equalizer 310 may have a first input that may receive the filtered version of the signal $a_k$ from the channel medium 306. An output of the linear equalizer 310 may present an equalized version of the received signal to a first input of the adder 312. An output of the adder 312 may present sum of the signal from the linear equalizer 310 and an output of the adaptive DFE 316 to an input of the slicer 314. An output of the slicer 314 may be presented to a first input of the adaptive DFE 316. The adaptation control circuit 318 may present a first control signal to a second input of the linear equalizer 310 and a second control signal to a second input of the adaptive DFE 316. The control signals generated by the adaptation control block 318 may be configured to control activation and scheduling of equalizer adaptation loops of the linear equalizer 310 and the adaptive DFE 316. The adaptation control block 318 may also present a third control signal that may be used to control the filter 308 via a back channel 320.

The equalizer adaptation loops of the linear equalizer 310 and the adaptive DFE 316 may be implemented using conventional techniques modified to allow control in accordance with the present invention. In one example, a technique for using a coordinating transmitter and receiver to set coefficients in (i) the filter 308, (ii) the linear equalizer 310 and (iii) the adaptive DFE 316 to optimize the serial transceiver for a particular channel may be found in a commonly-owned copending application U.S. Ser. No. 11/418,702, filed May 5, 2006, which is herein incorporated by reference in its entirety.

Figure 6:
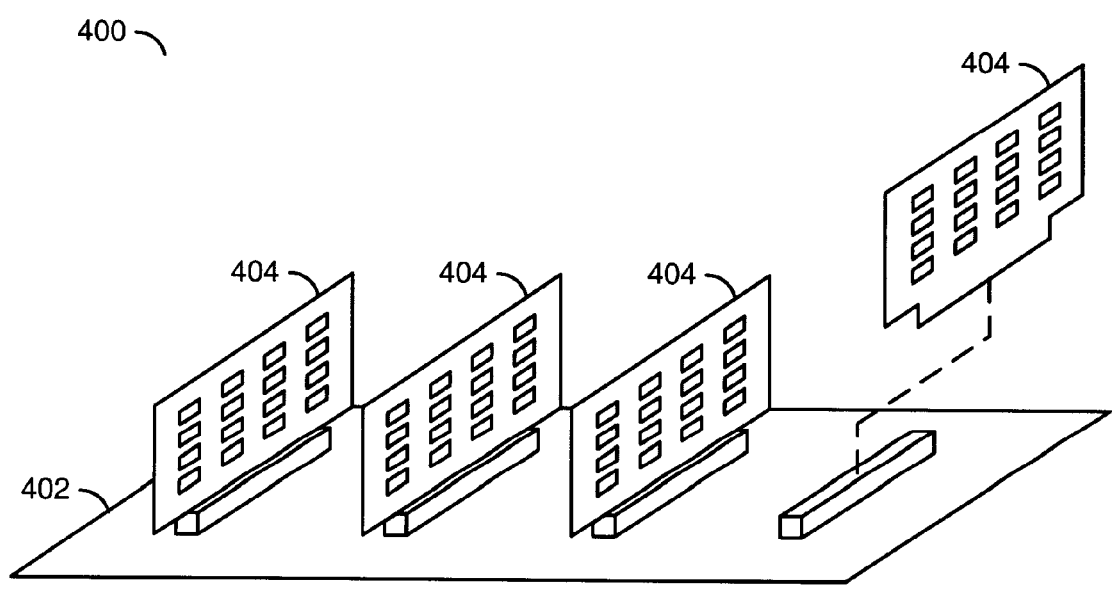
FIG. 6 is a diagram illustrating a switch chassis and line cards.

Referring to FIG. 6, a diagram is shown illustrating a system 400 in which the present invention may be implemented. In one example, the system 400 may comprise a switch chassis (or card) 402 and a number of line cards 404. In one example, the line cards 404 may have a number of serial transceivers. Equalizer adaption loops of the serial transceivers on the line cards 404 may be controlled using the techniques of the present invention. In one example, the serial transceivers on the line cards 404 may enter the training phase in response to a system reset. For example, upon a reset button being pressed the equalizer adaptation loops of all taps and channels of the system 400 may be activated simultaneously. In another example, when a line card 404 containing a number of serial transceivers (e.g., sixteen) is plugged into the switch chassis 402, the equalizer adaptation loops of a subset (e.g., sixteen) of the serial transceivers in the switch card 402 that connect to the line card 404 may be activated in the training phase, while any remaining serial transceivers in the switch card may be left alone (e.g., remaining in the operating phase). The sixteen serial transceivers on the newly inserted line card 404 would go through complete adaptation.

In one aspect, the present invention generally provides a method to automatically activate and deactivate transceiver adaptation loops in two phases; a training phase and an operating phase. The training phase may include a) activating adaptation to reach steady state and b) defining an adaptation coefficient range and time window to freeze the coefficients and terminate the training phase. The operating phase generally has adaptation inactive unless triggered by an event. Events that may trigger activation of adaptation may include, but are not limited to, a) periodic wake-up, b) temperature change, c) supply voltage change, and/or d) master coefficient change. In another aspect, the present invention generally provides a method to reduce peak power consumption during adaptation for an IC with multiple serial link transceivers that may include a) distinguishing minor vs. major operating environment changes, b) spreading out adaptation loops in time tap by tap and channel by channel on minor changes, and c) simultaneously adapting all taps in all channels on major changes.

The present invention may achieve a better bit-error ratio (BER) performance. In the training phase, tap coefficients settle at the calculated mean value. By settling tap coefficients at the calculated mean value the jitter induced by tap coefficient toggling may be reduced. In the meantime, relatively quick tracking and convergence may be achieved without the cost of performance degradation since a fast loop bandwidth is allowed in the training stage. In the operating phase, the tap values are mostly frozen to save power but the adaptation may be triggered by environment changes. The environmental changes may be monitored by temperature and/or voltage sensors or a limited number of remaining adaptation loops. Triggering adaptation based on environmental changes or a limited number of remaining adaptation loops minimizes performance degradation due to freezing adaptation coefficients most of the time.

The present invention may reduce power consumption. In the operating phase, the adaptation is turned off most the time, unless environment changes beyond a certain threshold occur. When an environment change is detected, the adaptation may be reactivated tap by tap and channel by channel, not all simultaneously. Reactivating adaptation tap by tap and channel by channel, instead of activating adaptation in all taps and channels simultaneously, generally reduces the peak power for an IC with multiple transceivers.

The automatic bandwidth control adaptation techniques of the present invention may be used for other adaptation loops besides decision feedback equalization (DFE), linear equalization (LE) and gain (e.g., filter pole/zero positioning). The automatic bandwidth control adaptation techniques of the present invention may be applied not only in high-speed transceivers, but also in similar data transmission and storage systems.

To achieve better BER performance with less power, the present invention provides automatic bandwidth control of DFE, LE and gain adaptation, in which DFE, LE and gain adaptation automatically turn on and off in two phases: the training phase and the operating phase. In the training phase, DFE, LE and gain adaptation for all taps and all channels turns on until all the coefficients reach the steady state. A coefficient reaching the steady state may be detected when the coefficient only takes on values within a range $D_{min}$ or when the coefficient reaches a maximum or minimum value for a duration $T_{ss}$. The value of $D_{min}$ generally depends on the bandwidth of the adaptation loop filter. The higher the bandwidth required, the larger $D_{min}$ may become. $D_{min}$ may be set individually for each coefficient in each channel. For example, for a coefficient that takes on the values in the set $S=\{c_1, c_2, \ldots, c_n\}$ such that $\max\{S\}-\min\{S\} \leq D_{min}$ for the duration $T_{ss}$, the set $S$ may be referred to as the steady-state value set. The final value of the coefficient may be determined by calculating the mean of the values in the steady-state set according to the following Equation 1:

$$\frac{1}{n}\sum_{i=1}^{n} Ci. \qquad \text{Eq. 1}$$

For example, for $D_{min}$ having a value of 4 mV, when a coefficient takes on only the values in the steady-state value set $\{-10\text{ mV}, -8\text{ mV}, -6\text{ mV}\}$ for the duration $T_{ss}$, the final value may be $-8$ mV. When all coefficients of all channels have reached the steady state, the training phase may terminate. The bandwidth of the adaptation during the training phase may be high to achieve fast tracking for optimal BER performance.

In the operating phase, the DFE, LE and gain adaptation may be inactive unless triggered by any of following events: a) periodic wake-up, b) temperature change, and c) supply voltage change. For the first event, a timer may periodically activate the adaptation loop. The timer period may be application-dependent. The timer may be implemented on-chip as a counter or in external or on-chip firmware. For the second and third events, temperature sensors, current sensors, and ring oscillators may be implemented to detect changes in temperature and supply voltage. When a temperature sensor detects a temperature change beyond a preset temperature threshold (e.g., $\Delta t$), the adaptation loop may be activated. Similarly, when the current sensor detects a current change beyond a preset current threshold (e.g., $\Delta i$), or when the ring oscillator frequency changes beyond a preset frequency threshold (e.g., $\Delta f$), the adaptation loop may also be activated.

Alternatively, instead of deactivating all adaptation loops of all channels in the operating phase, the adaptation loops of a subset of coefficients in a subset of channels may remain active. These coefficients may be referred to as master coefficients. For example, only the first DFE coefficient (tap) adaptation in channel 0 is active while other DFE coefficients, LE and gain adaptation in channel 0 and all DFE, LE and gain adaptation in all other channels are inactive. The adaptation loops of the master coefficients generally function as operating environment change monitors. The adaptation loops of the non-master coefficients may be reactivated when one or more of the master coefficients change over a preset threshold (e.g., $\Delta n$). In one example, the criterion for non-master coefficient reactivation may be further restricted by specifying that all master coefficients change over a given threshold along the same direction. When only temperature and supply voltages are explicitly monitored, both periodic wake-up and master coefficient change detection may be used to detect channel loss changes due to changes in humidity.

To reduce the peak power consumption during DFE, LE and gain adaptation for an IC with multiple transceivers, adaptation loops may be reactivated sequentially tap by tap and channel by channel. More adaptation loops may be reactivated simultaneously if the operating environment changes drastically. To distinguish a minor operating environment change from a major one, two threshold levels for each trigger event may be set for detecting changes using the aforementioned schemes. For example, a lower (or minor) threshold (e.g., ($\Delta_{small}$)) and an upper (or major) threshold (e.g., $\Delta_{large}$) may be implemented for each type of change to be monitored. For example, a set of thresholds ($\Delta t_{small}$, $\Delta t_{large}$), ($\Delta i_{small}$, $\Delta i_{large}$), ($\Delta f_{small}$, $\Delta f_{large}$), and/or ($\Delta n_{small}$, $\Delta n_{large}$), where the first threshold in each pair represents a minor change and the second threshold a major change, may be implemented for monitoring temperature, current, frequency and/or master coefficient, respectively. When a minor change occurs, the adaptation loops may be activated tap by tap and channel by channel to reduce instantaneous power. When a major change occurs, the adaptation loops of all channels may be activated simultaneously to avoid any BER degradation. For example, $\Delta n_{small}=3$ sets the threshold for a small master coefficient change and may represent a change of three steps in the coefficient. To represent a major change, $\Delta n_{large}$ may be set to 5, or a change of five steps for the master coefficient.

The present invention may provide a method and/or apparatus for automatic bandwidth control of equalizer adaptation loops that may (i) provide automatic bandwidth control of decision feedback equalization (DFE), linear equalization (LE) and gain adaptation, (ii) achieve better bit error rate (BER) performance than conventional solutions, (iii) automatically activate and deactivate transceiver adaptation loops in two phases, (iv) include a training phase and an operating phase, (v) reduce peak power consumption during adaptation, (vi) be implemented in integrated circuits with multiple serial link transceivers, (vii) distinguish between minor and major changes in operating environment, (viii) spread out adaptation loops in time for minor changes in operating environment, (ix) perform adaptation tap by tap, (x) perform adaptation channel by channel, (xi) simultaneously adapt all taps and channels for major changes in operating environment, (xii) minimize performance degradation and/or (xiii) be used in high-speed transceivers, serializer/deserializers (SerDes), data transmission systems and data storage systems.

The functions performed by the flow diagrams of FIG. 1-3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method to reduce power consumption in a plurality of serial transceivers, said method comprising the steps of:
   (A) inactivating equalizer adaptation loops of said plurality of serial transceivers until a pre-defined triggering event occurs;
   (B) defining a first threshold value corresponding to a minor change associated with said pre-defined triggering event and a second threshold value corresponding to a major change associated with said pre-defined triggering event;
   (C) automatically detecting an occurrence of the pre-defined triggering event and determining whether a change associated with the pre-defined triggering event comprises a minor change or a major change based upon said first and said second threshold values, respectively;
   (D) when the change associated with the pre-defined triggering event is determined to be a minor change, sequentially activating the equalizer adaptation loops tap by tap and channel by channel over a period of time; and
   (E) when the change associated with the pre-defined triggering event is determined to be a major change, simultaneously activating all of the equalizer adaptation loops.

2. The method according to claim 1, further comprising simultaneously activating all of the equalizer adaptation loops to reach a steady state condition prior to inactivating the equalizer adaptation loops.

3. The method according to claim 2, wherein all of the equalizer adaptation loops are simultaneously activated in response to a reset.

4. The method according to claim 1, further comprising simultaneously activating all equalizer adaptation loops of a subset of serial transceivers in a switch card associated with a line card to reach a steady state condition prior to inactivating the equalizer adaptation loops of the subset of serial transceivers associated with the line card.

5. The method according to claim 4, wherein the equalizer adaptation loops of the subset of serial transceivers are activated in response the line card being coupled to the switch.

6. The method according to claim 1, wherein the pre-defined triggering event comprises a change in a factor selected from the group consisting of channel characteristics and operating environment.

7. The method according to claim 1, wherein the pre-defined triggering event comprises a change in a parameter selected from the group consisting of temperature, humidity and supply voltage and one or more master coefficients.

8. The method according to claim 1, wherein the pre-defined triggering event comprises a change in a parameter selected from the group consisting of skin loss, dielectric loss, return loss and one or more master coefficients.

9. The method according to claim 1, wherein the pre-defined triggering event comprises a periodic wake-up.

10. The method according to claim 1, wherein the change is minor when a magnitude of the change is greater than or equal to said first threshold value and less than said second threshold value.

11. The method according to claim 1, wherein the change is major when a magnitude of the change is greater than or equal to said second threshold value.

12. The method according to claim 1, wherein the equalizer adaptation loops are selected from the group consisting of decision feedback equalization (DFE), linear equalization (LE) and gain adaptation.

13. A method for automatic adaptation bandwidth control in an integrated circuit (IC) with multiple serial link transceivers comprising:
   providing a training phase in said integrated circuit IC, wherein equalizer adaptation loops of the multiple serial link transceivers are activated simultaneously to set all adaptation parameters of said multiple serial link transceivers; and
   providing an operating phase in said IC, wherein said equalizer adaptation loops of said multiple serial link transceivers are sequentially activated tap by tap and channel by channel over a period of time in response to detection of a minor environmental change.

14. The method according to claim 13, wherein the training phase comprises the steps of:
   activating said equalizer adaptation loops for all taps and all channels of said multiple serial link transceivers;
   determining when all of said taps and channels are in a steady state condition;
   determining mean values for coefficients of said taps and channels; and
   freezing all of said taps and channels with said mean values and deactivating said equalizer adaptation loops.

15. The method according to claim 13, wherein the operating phase comprises the steps of:

inactivating said equalizer adaptation loops until detection of said environmental change;

when said environmental change is detected, determining whether said environmental change is a minor change or a major change based on a predefined first threshold value and a predefined second threshold value;

when the said environmental change is a minor change, spreading out activation of the equalizer adaptation loops over said time period; and when said environmental change is a major change, simultaneously activating all of the equalizer adaptation loops.

16. The method according to claim 15, wherein said environmental change comprises a change in a parameter selected from the group consisting of channel characteristics, operating environment, temperature, humidity, supply voltage, skin loss, dielectric loss, return loss and one or more master coefficients.

17. The method according to claim 15, wherein said environmental change comprises a periodic wake-up.

18. The method according to claim 16, wherein (i) the change is minor when a magnitude of the change is greater than or equal to a first threshold and less than a second threshold and (ii) the change is major when said magnitude is greater than or equal to said second threshold.

19. An apparatus comprising:

a plurality of serial link transceivers having equalizer adaptation loops; and an automatic adaptation bandwidth control circuit coupled to said plurality of serial link transceivers, wherein said automatic adaptation bandwidth control circuit (A) inactivates said equalizer adaptation loops of said plurality of serial link transceivers until a pre-defined triggering event occurs, (B) automatically detects the pre-defined triggering event and determines whether a change associated with the pre-defined triggering event is a minor change or a major change based upon a comparison with a pre-defined first threshold value and a pre-defined second threshold value (C) sequentially activates the equalizer adaptation loops tap by tap and channel by channel over a period of time when the change is minor and (D) simultaneously activates all of the equalizer adaptation loops when the change is major.

20. The apparatus according to claim 19, further comprising sensors detecting changes in temperature, humidity and supply voltage, wherein the pre-defined triggering event comprises a change in any parameter selected from the group consisting of temperature, humidity and supply voltage and one or more master coefficients.

* * * * *